United States Patent
Chen et al.

(10) Patent No.: US 7,367,586 B2
(45) Date of Patent: May 6, 2008

(54) AIRBAG RESTRAINT FOR AUTOMOTIVE VEHICLE

(75) Inventors: Weigang Chen, Canton, MI (US); Yan Fu, Canton, MI (US); Baohua Xiao, Canton, MI (US); Marwan Ahmad El-Bkaily, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 10/908,367

(22) Filed: May 9, 2005

(65) Prior Publication Data

US 2006/0249942 A1   Nov. 9, 2006

(51) Int. Cl.
B60R 21/18      (2006.01)

(52) U.S. Cl. .................................................. 280/743.2

(58) Field of Classification Search ............. 280/743.2, 280/743.1, 728.1, 731, 733
See application file for complete search history.

(56) References Cited

U.S. PATENT DOCUMENTS

| | | | | |
|---|---|---|---|---|
| 3,879,056 A | * | 4/1975 | Kawashima et al. ...... | 280/743.2 |
| 5,018,762 A | * | 5/1991 | Suzuki et al. ............... | 280/731 |
| 5,358,273 A | * | 10/1994 | Onishi et al. ............ | 280/743.1 |
| 5,380,038 A | | 1/1995 | Hawthorn et al. | |
| 5,452,915 A | * | 9/1995 | Fredin ...................... | 280/743.2 |
| 5,607,183 A | * | 3/1997 | Nishimura et al. ...... | 280/743.2 |
| 5,692,774 A | | 12/1997 | Acker et al. | |
| 5,845,935 A | | 12/1998 | Enders et al. | |
| 6,454,300 B1 | | 9/2002 | Dunkle et al. | |
| 6,478,332 B1 | | 11/2002 | Ono et al. | |
| 6,796,583 B2 | | 9/2004 | Keshavaraj | |
| 2003/0168842 A1 | * | 9/2003 | Igawa ...................... | 280/743.2 |
| 2004/0026912 A1 | * | 2/2004 | Yamada et al. ........... | 280/743.2 |
| 2004/0051285 A1 | * | 3/2004 | Fischer ....................... | 280/739 |
| 2004/0119271 A1 | | 6/2004 | Webber | |
| 2004/0195807 A1 | | 10/2004 | Hasebe et al. | |
| 2005/0212276 A1 | * | 9/2005 | Yamada .................... | 280/743.2 |
| 2006/0175819 A1 | * | 8/2006 | Abe ......................... | 280/743.2 |
| 2006/0232054 A1 | * | 10/2006 | Schlosser et al. ........ | 280/743.2 |
| 2006/0249942 A1 | * | 11/2006 | Chen et al. .............. | 280/743.2 |
| 2007/0029762 A1 | * | 2/2007 | Katsuda et al. ........... | 280/728.2 |
| 2007/0050530 A1 | * | 3/2007 | Rajan ............................ | 711/5 |

FOREIGN PATENT DOCUMENTS

DE      19914214 A1    10/2000
WO      0012359 A1     9/2000

* cited by examiner

*Primary Examiner*—Eric Culbreth
*Assistant Examiner*—Karen J. Amores
(74) *Attorney, Agent, or Firm*—Frank MacKenzie; Dickinson Wright PLLC

(57) ABSTRACT

An airbag restraint for an automotive vehicle includes generally circular front and rear panels, and an inflator attached to the rear panel and acting through an inflator aperture formed in the rear panel. At least one internally tethered section extends laterally along a chord of the front panel at a position at or near the projected location of the inflator. The internally tethered section is defined and shaped by more than one laterally extending tether extending between the front and rear panels of the airbag.

1 Claim, 2 Drawing Sheets

AIRBAG RESTRAINT FOR AUTOMOTIVE VEHICLE

BACKGROUND OF THE INVENTION

1. Field of the Invention

The present invention relates to a supplemental restraint system for use in a vehicle. Such restraint systems are commonly called "airbags."

2. Disclosure Information

As shown in FIG. 6 herein, a prior art airbag, 600, for use at the driver's position of a vehicle commonly use two longitudinal tethers, 602, which are generally located about the hub of steering wheel 606 at clock positions, 12 o'clock and 6 o'clock. The present inventors have determined that for certain vehicles, it is desirable to reshape the inflated airbag according to the present invention in a manner not comprehended by the prior art, by using laterally extending tethered sections of the airbag, as opposed to the prior art's superimposed longitudinal tethering structures. Although the prior art is replete with a variable plethora of tethering schemes, none restrict airbag lateral deployment and longitudinal deployment in the manner provided by the structures according to the present invention. These structures result in more favorable energy management and loading kinematics during a vehicle impact event.

SUMMARY OF THE INVENTION

An airbag restraint for an automotive vehicle includes a generally circular front panel, a generally circular rear panel mated to the front panel, and an inflator attached to the rear panel and acting through an inflator aperture formed in the rear panel. At least one internally tethered section extends laterally along a chord of the front panel at a position proximate the projected location of the inflator. The internally tethered section is preferably generated by a plurality of internal, longitudinal tethers attached to both the rear panel and the front panel. Each tether extends laterally along a portion of the previously described chord of the front panel. Taken together, the ends of the tethers that are attached to the front panel encompass at least about one-half the length of a chord extending laterally across the front panel. Alternatively, the internally tethered section may be generated by more than one internal laterally extending tether positioned at a number of parallel chordal locations, with each of the tethers being attached to the front and rear panels at the common outer periphery of the front and rear panels. In this embodiment, the internally tethered section will be generated by a plurality of unequal length laterally extending tethers positioned at two chordal locations, with each of the tethers being attached to the front and rear panels at the front and rear panels' common outer periphery. This embodiment may further include at least one additional interior longitudinal tether attached to and extending laterally across a portion of the front and rear panels at a location between the inflator aperture and the shortest one of the plurality of laterally extending tethers.

An airbag restraint according to the present invention may further include a steering column upon which the front panel, the rear panel and an inflator are mounted. The tethers themselves preferably comprise lengths of airbag material formed individually into a strap-like configuration.

According to another aspect of the present invention, the internally tethered section of an airbag may be generated by a plurality of parallel longitudinal tethers, with each extending laterally along a portion of the common chord of the front and rear panels. As yet another alternative, the internally tethered section may be generated by an array of generally longitudinal tether webs, with each tether web extending radially outwardly from the rear panel from a location approximate the inflator, and with each of the tether webs having an outboard end attached to the front panel along a laterally extending chord, and with the outboard ends of the tether webs being spaced so as to encompass at least about one-half of the length of the chord. The inboard ends of the longitudinal tether webs are attached to the rear panel of the airbag.

It is an advantage of a system according to present invention that the airbag is preferentially reshaped from basically a toroidal shape to a more complex shape characterized by greater volume of the airbag at an lower portion of the deployed airbag and lesser volume at an upper portion of the airbag.

Other advantages, as well as features and objects of the present invention will become apparent to the reader of this specification.

DETAILED DESCRIPTION OF PREFERRED EMBODIMENTS

Figure 1:
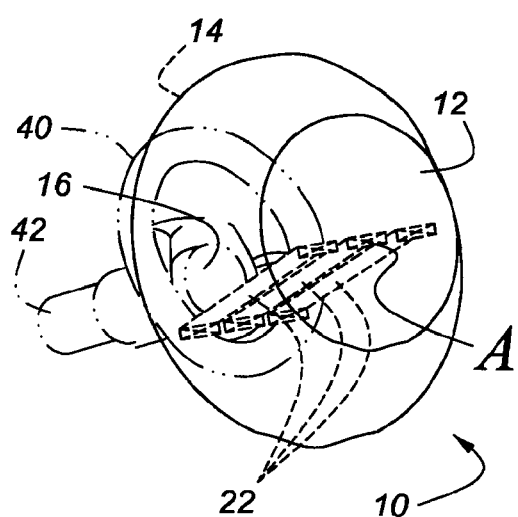
FIG. 1 is a perspective view of an inflated airbag according to a first embodiment of the present invention.
Figure 2:
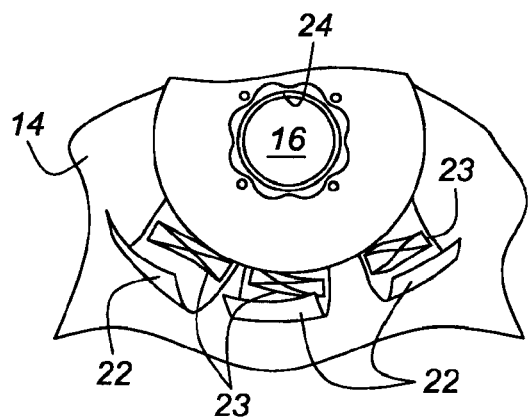
FIG. 2 shows an interior detail of the airbag of FIG. 1, with the airbag in an uninflated state.
Figure 3:
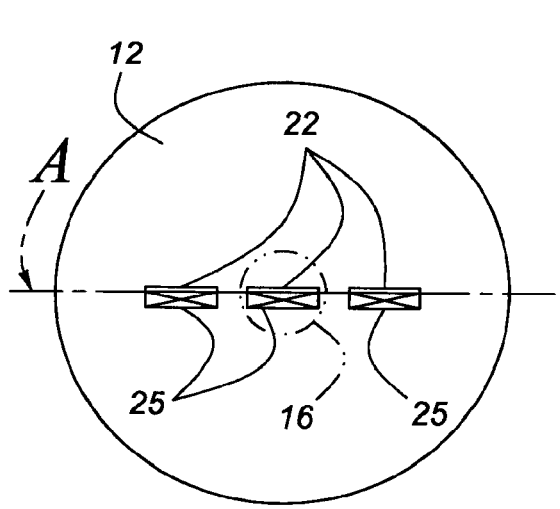
FIG. 3 is an exterior plan view of the front panel of an airbag according to one aspect of the present invention.

As shown in FIGS. 1 and 3, airbag restraint 10 has a generally circular front panel, 12, to which three internal longitudinal tether webs, 22, are stitched. These tethers, as shown in FIG. 1, shape the inflated airbag 10 by pulling longitudinally and radially against generally circular front panel 12 and generally circular rear panel 14. Tether webs 22, as shown in FIG. 2, are attached by stitching 23 to generally circular rear panel 14 at locations proximate to inflator port 24. Tethers 22 extend, at least initially, radially outwardly from rear panel 14. As shown in FIG. 3, each of tethers 22 has an outboard end, 25, which is attached, preferably by stitching, to front panel 12 along a chord, A (FIG. 3), which extends laterally across front panel 12. As an alternative embodiment, tethers 22 need not extend radially from rear panel 14, but rather could extend from a chord across rear panel 14 to attach in parallel fashion to chord A of front panel 12. Rear panel 14, front panel 12, and airbag inflator 16 are attached to steering column 42. Airbag 10 inflates through the circular portion of steering wheel 40. Tether webs 22 are preferably attached to front panel 12 proximate the projected location of inflator 16. This means that if tether webs 22 are viewed from the front of airbag restraint 10, the webs will located on a laterally extending chord which is either at the center of inflator 16, or above or below the center of inflator 16. In each case chord A, as seen in FIGS. 1 and 3 will be in the vicinity of inflator 16.

Figure 4:
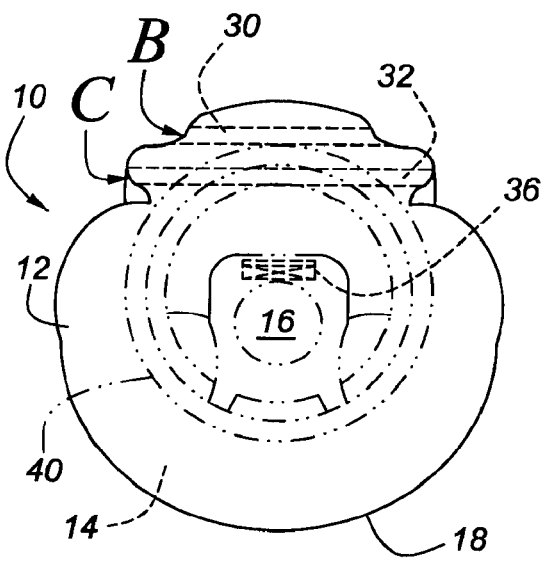
FIG. 4 illustrates a second embodiment of an airbag according to the present invention and shown in an inflated state.

As shown in FIG. 4, in an alternative embodiment, the present airbag utilizes an internally tethered section generated by first lateral tether 30 and second lateral tether 32. Tethers 30 and 32 are generally parallel, and extend across parallel chords of airbag 10. Each of tethers 30 and 32 is formed, as before, from a strap of airbag material, which is sewn at its ends into the front panel 12 and rear panel 14 at their common outer periphery, 18.

In addition to lateral tethers 30 and 32, the embodiment of FIG. 4 also has a longitudinal tether, 36, which is sewn into front panel 12 and rear panel 14 at a location above inflator 16. Thus, the airbag of FIG. 4 is a hybrid airbag because it utilizes both laterally extending tether webs 30 and 32 and longitudinally extending tether web 36. The embodiment of FIG. 4 also has an internally tethered section extending laterally along a chord of the front panel at a position above the location of the inflator. In general, longitudinal tether 36 of FIG. 4 extends laterally across a portion of front and rear panels 12 and 14 at a location between inflator aperture 24 and the shortest one, i.e., 32, of the laterally extending tether webs.

Figure 5:
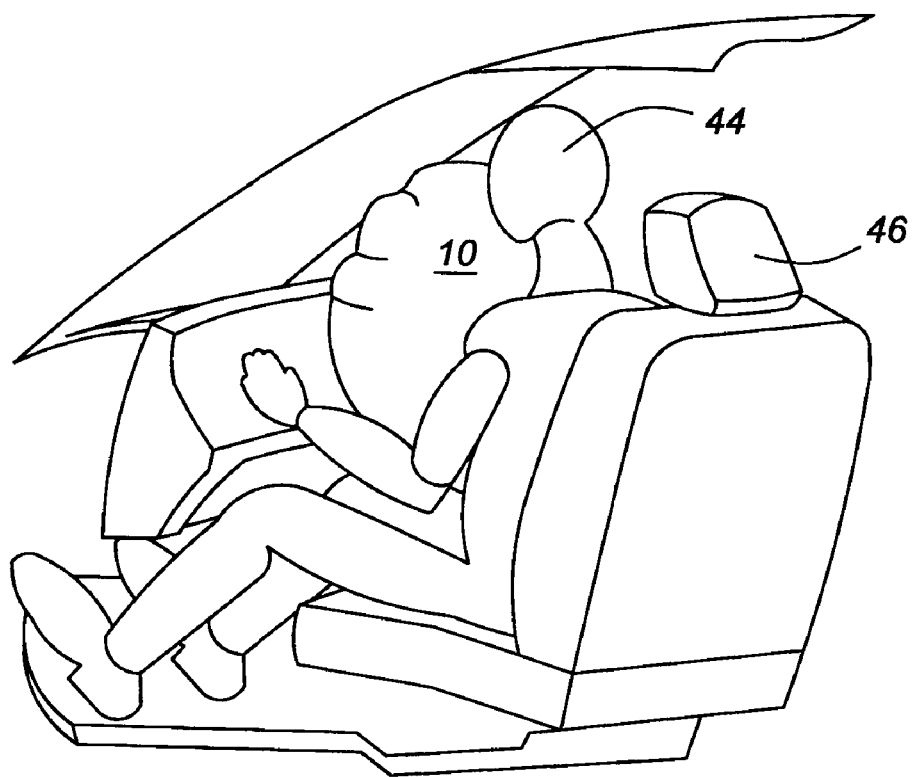
FIG. 5 illustrates a simulated occupant-airbag interaction with the airbag of FIG. 4.
Figure 6:
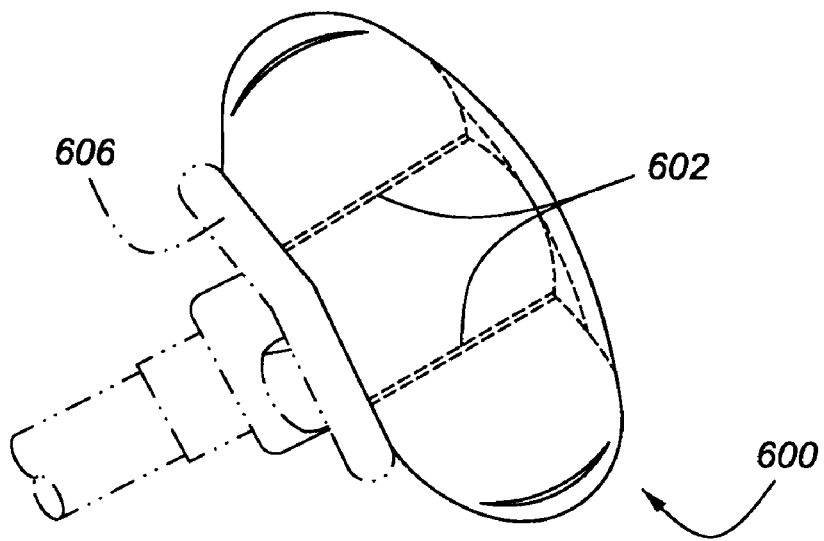
FIG. 6 shows a prior art airbag.

FIG. 5 illustrates an interaction between a simulated occupant, 44, seated on seat 46, and inflated airbag 10, according to FIG. 4. It is noted that the construction of FIG. 4 and, for that matter FIG. 1, produces a tethered airbag shape in which the volume of the airbag is shifted downwardly, so as to provide a larger volume for reacting to the upper torso of the simulated occupant.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An airbag restraint for an automotive vehicle, comprising:
   a generally circular front panel;
   a generally circular rear panel mated to said front panel;
   an inflator attached to said rear panel and acting through an inflator aperture formed in said rear panel; and
   a plurality of internal, laterally extending, parallel tethers positioned at a plurality of chordal locations, with each of said tethers being attached to said front and rear panels at the common outer periphery of the front and rear panels such that said tethers form the upper portion, when the airbag is deployed, into a radially and axially directed outcropping positioned upon a lower portion of the airbag whereby the volume of the airbag is shifted downwardly so as to provide a larger volume for reacting to the upper torso of a vehicle occupant.

* * * * *